April 20, 1937.  A. E. RAMCLOW  2,077,954

SEALING UNIT FOR ROTARY SHAFTS

Filed March 13, 1936

Inventor
Axel E. Ramclow
By I. J. Lassagne
Atty.

Patented Apr. 20, 1937

2,077,954

UNITED STATES PATENT OFFICE 2,077,954

SEALING UNIT FOR ROTARY SHAFTS

Axel E. Ramclow, Chicago, Ill., assignor to International Harvester Company, a corporation of New Jersey Application March 13, 1936, Serial No. 68,591

3 Claims. (Cl. 286—11)

This invention relates to a sealing unit for rotary shafts. More particularly it relates to a shaft sealing unit adapted for refrigerating compressors and the like where a very good seal must be maintained, to prevent escape of the refrigerant.

In the construction of compressors for household refrigerators, expansible, metallic bellows are used to provide a long life for a rotary sealing member or a sealing member which contacts with a rotating part. A compression spring is utilized to maintain the sealing member in contact with its cooperating member and to take up wear as it occurs. The seal must be constructed as a unit, as they are more or less frequently replaced, often by unskilled labor. It is, therefore, very desirable to construct the seal as a readily removable element which can be replaced without any possibility of danger or wrong assembly.

The object of the present invention is to construct a seal which can be handled without damage to its component parts and which can be readily and accurately assembled into operating position.

Figure 1:
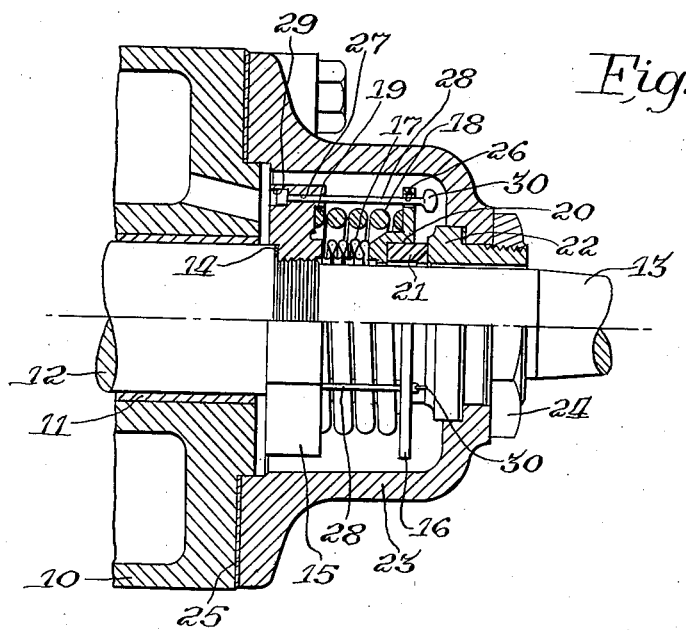
Figure 1 is a sectional view, showing a portion of a housing, a rotary shaft, a housing for the shaft seal, and a sealing unit. (A center line of the shaft is shown, at one side of which the sealing unit is shown in elevation, and at the other side of which the sealing unit is shown in section)
Figures 2, 3:
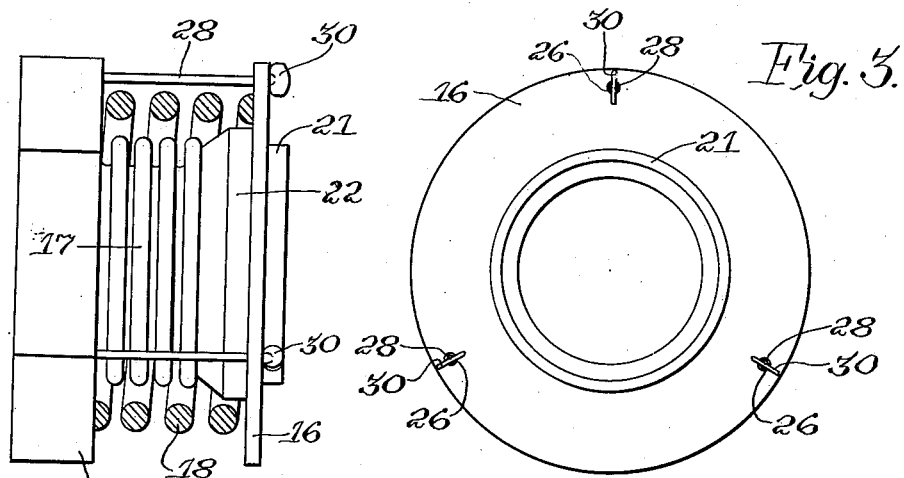
Figure 2 is an elevation of the sealing unit independent of the housing with the compression spring in full expanded position; and, Figure 3 is an end elevation of the unit shown in Figure 2.

The portion of the housing 10 which is shown may be a portion of a compressor for refrigerating apparatus of either the rotary or reciprocating type. A bushing 11 provides a bearing for a shaft 12. Said shaft has a reduced end portion 13, which extends behind the housing to provide for mounting a driving pulley. At the juncture of the reduced end portion with the main shaft, a shoulder is formed, against which a sealing member 14 is fitted. The portion 13 of the shaft is threaded adjacent the shoulder to provide means for rigidly securing the sealing unit.

The sealing unit consists essentially of an annular supporting member 15, an annular holding member 16 for supporting the sealing member, a corrugated, cylindrical bellows 17 brazed, soldered, or otherwise permanently secured to the two members in fluid tight relation therewith, and a compression spring 18. The supporting member 15 is provided with internal threads by means of which it is threaded on the portion 13 of the shaft abutting the gasket or sealing member 14, thereby forming a fluid tight connection. The compression spring 18 is fitted in an annular recess 19 in the member 15 to hold it concentric with respect to the shaft whereby a uniform pressure is exerted against the seal holding member 16. The member 16 is provided with an annular recess 20 into which a sealing member 21 is mounted in a fluid tight manner. Said member is of a suitable composition to provide a long life bearing and sealing contact with a cooperating sealing member 22. The member 22 is removably secured to the seal unit housing 23 by a nut 24, whereby it may be removed and replaced, if necessary. The connection between the member 22 and the housing 23 is made fluid tight by a suitable gasket. The housing 23 is secured to the main housing 10 in a fluid tight manner by means of a gasket 25, as illustrated.

The members 15 and 16 are provided at three circumferentially spaced points with aligned openings 26 in the member 16, and 27 in the member 15. Set-rods 28 extend through these openings. As illustrated, said rods are permanently secured to the member 15 by being headed into bores 29 formed at one end of the openings 27. The rods are illustrated as slidably extending through the openings 26, whereby relative movement may take place between the members 15 and 16 when the sealing unit is in compressed position, as shown in Figure 1. Heads 30 are formed on the set-rods 28 to serve as limiting stops when the unit is not in compressed position. The rods are sufficiently long, however, to allow normal take-up by the compression spring 18 of wear during the life of the seal. The principal purpose of the set rods 28 is to permit of factory assembling of the sealing unit. To make a satisfactory seal, a compression spring 18 of considerable strength is required through a substantial elongation. The metallic bellows 17 by its inherent nature is not capable of stretching axially to any degree without possible damage thereto. It is, therefore, evident that a problem is encountered in assembling the sealing units of this type at the factory for installation in service. This problem applicant has overcome by devising the construction as illustrated and above described. The unit is assembled at the factory in suitable fixtures and compressed to the desired extent. The tie-rods 28 are then headed to hold the unit securely in position, thereby preventing any damage to the bellows. The stay-rods limit distortion of the unit in other directions as well as axially of the spring, thereby forming in effect a cage which supports the bellows and prevents damage thereto. For servicing a compressor, it is only necessary to unscrew the sealing unit which for convenience is provided with a hexagonal surface on the member 15. The new unit is threaded into place and the housing 23 is replaced. As the housing is tightened into position the sealing members contact and compress the member 16 relative to the member 15. In this manner the replacement is readily made without any possible damage to the metallic bellows and without the necessity of complicated operations requiring skilled workmen.

It is to be understood that applicant has disclosed and shown only a preferred embodiment of his improved shaft sealing unit and that he claims as his invention all modifications thereof falling within the scope of the appended claims.

What is claimed is:

1. A shaft sealing unit comprising an annular supporting member formed to be mounted on a shaft in fluid tight relation thereto, an expansible metallic bellows secured to said member in fluid-tight relation therewith, an annular seal supporting member secured to said bellows, a sealing member carried by said member, a compression spring fitted between the two annular members around the bellows and spaced therefrom, and headed stay-rods secured to one of the annular supporting members for limiting axial movement of the other annular supporting member with respect thereto, said rods being slidably mounted with respect to said other member to permit compression and limited expansion of the spring, said annular members and said stay-rods forming a cage for protecting the metallic bellows against expansion and distortion.

2. A shaft sealing unit comprising an annular supporting member formed to be secured to one of two members rotatable with respect to each other, a shaft in fluid-tight relation thereto, an expansible metallic bellows secured to said member in fluid-tight relation therewith, an annular seal supporting member secured to said bellows, an annular sealing member carried by said member, a compression spring fitted between the two annular supporting members around the bellows and spaced therefrom, and headed stay-rods secured to one of the annular supporting members for limiting axial movement of the other annular supporting member with respect thereto, said rods being slidably mounted with respect to said other member to permit compression of the spring.

3. A shaft sealing unit comprising an annular supporting member formed to be threaded on a shaft in fluid-tight relation thereto, an expansible metallic bellows secured to said member in fluid-tight relation therewith, an annular seal supporting member secured to said bellows, an annular sealing member carried by said member, a compression spring fitted between the two annular supporting members around the bellows and spaced therefrom, and headed stay-rods secured to one of the annular supporting members for limiting axial movement of the other annular supporting member with respect thereto, said rods being slidably mounted with respect to said other member to permit compression and limited expansion of the spring.

AXEL E. RAMCLOW.